United States Patent [19]

Furuya et al.

[11] Patent Number: 5,044,944
[45] Date of Patent: Sep. 3, 1991

[54] FURNACE OF DECREASING OXYGEN CONCENTRATION TO ULTRA LOW AMOUNT

[75] Inventors: Toshio Furuya, Kanagawa; Masayoshi Hamano, Tokyo, both of Japan

[73] Assignees: Yugen Kaisha R.I. Electronic Industry; Yamato Works Co., Ltd., both of Tokyo, Japan

[21] Appl. No.: 490,768

[22] Filed: Mar. 8, 1990

[30] Foreign Application Priority Data

Oct. 12, 1989 [JP] Japan .................................. 63-2656

[51] Int. Cl.$^5$ ............................................... F27B 9/02
[52] U.S. Cl. ..................... 432/128; 432/136; 432/143; 432/153
[58] Field of Search ............... 432/59, 128, 136, 143, 432/153

[56] References Cited

U.S. PATENT DOCUMENTS

| | | | |
|---|---|---|---|
| 2,713,480 | 7/1955 | Ruckstahl | 432/128 |
| 3,850,318 | 11/1974 | Wentworth | 432/128 |
| 3,982,887 | 9/1976 | Kendziora et al. | 432/128 |
| 4,397,451 | 8/1983 | Kinoshita et al. | 432/128 |
| 4,586,898 | 5/1986 | Orbeck | 432/128 |
| 4,773,851 | 9/1988 | Mueller | 432/136 |

Primary Examiner—Henry C. Yuen
Attorney, Agent, or Firm—Michael J. Striker

[57] ABSTRACT

A furnace of decreasing oxygen concentration to ultra low amount is basically characterized by providing a furnace body divided into a plurality of zones, a device for supplying a non-oxidizing or a reducing atmospheric gas into each of the zones so as to increase the internal pressure, shutter devices provided at least at an inlet and an outlet of the furnace body for checking the flowing atmosphere, transferring devices installed at the inside of the furnace, at the interior and at the outside thereof respectively, and a control device for opening the shutter device before the work in a transferring direction, wherein the transferring device installed within the furnace supports the work at its both sides of the under surface and continuously send it while the upper surface of the work is exposed to the atmosphere in the furnace.

1 Claim, 4 Drawing Sheets

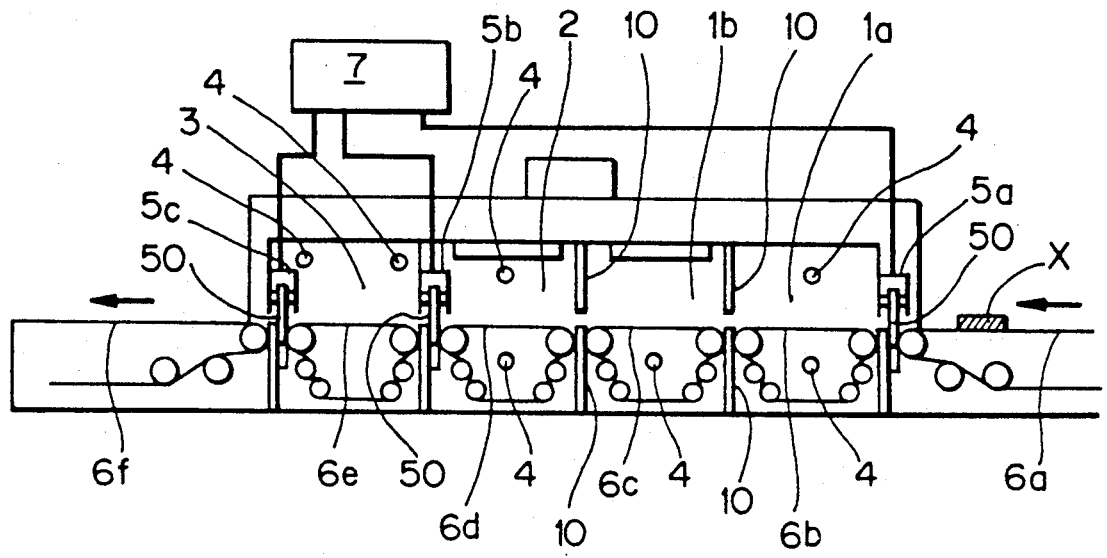
FIG_1
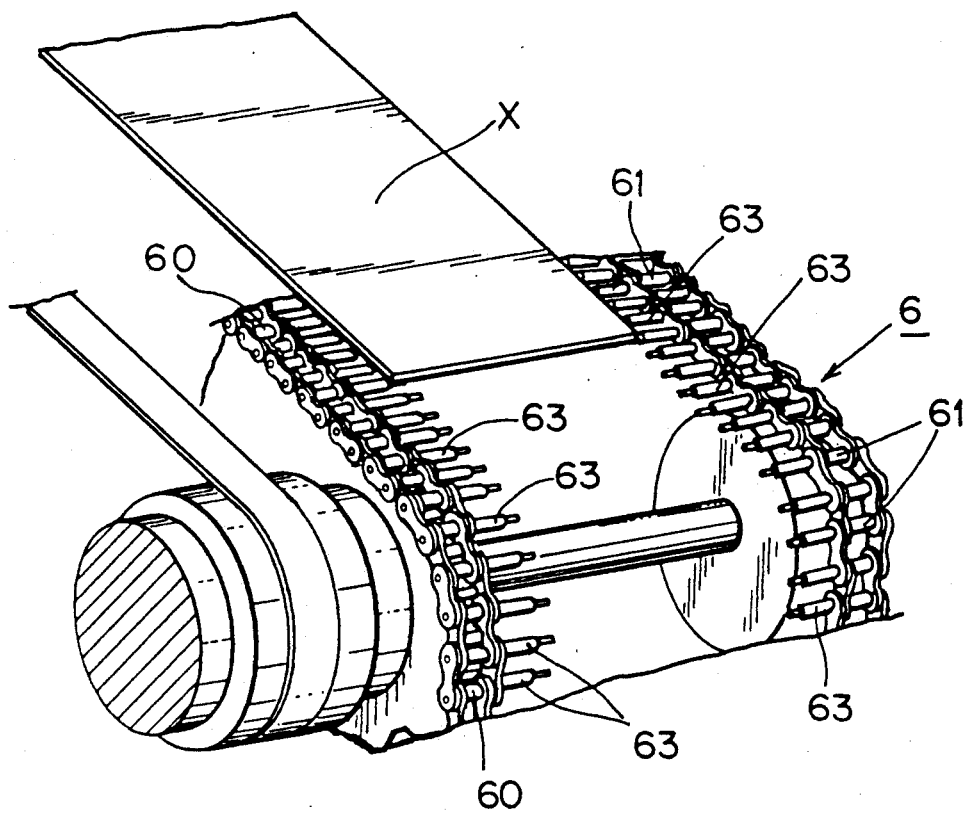
FIG_2

FIG_3(a)
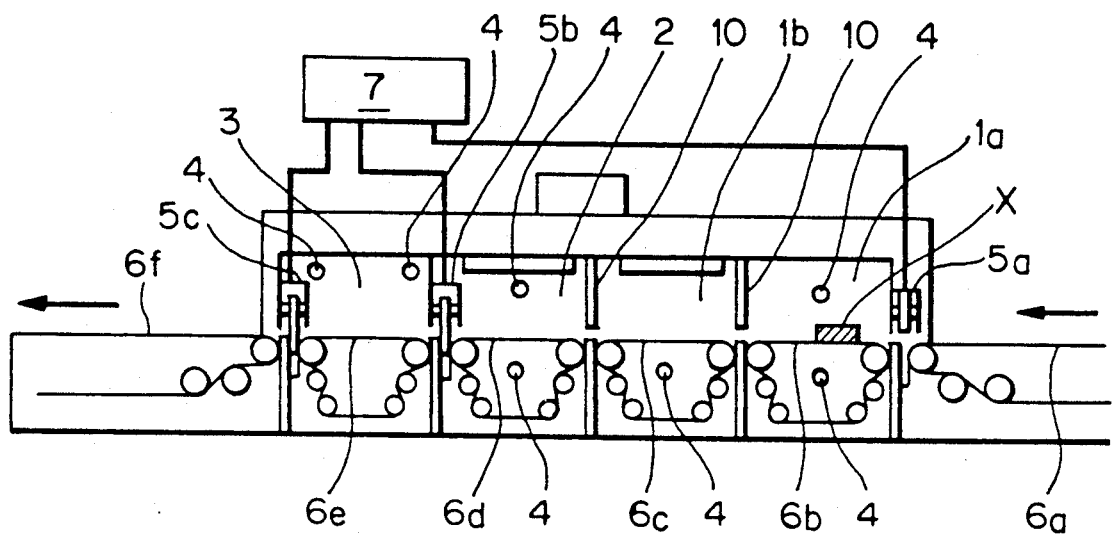
FIG_3(b)
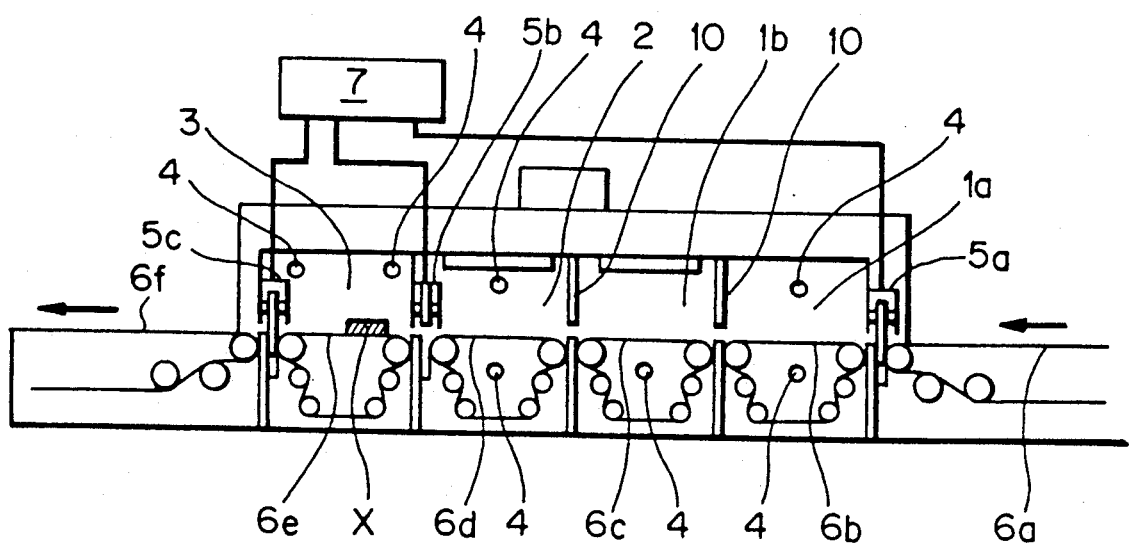

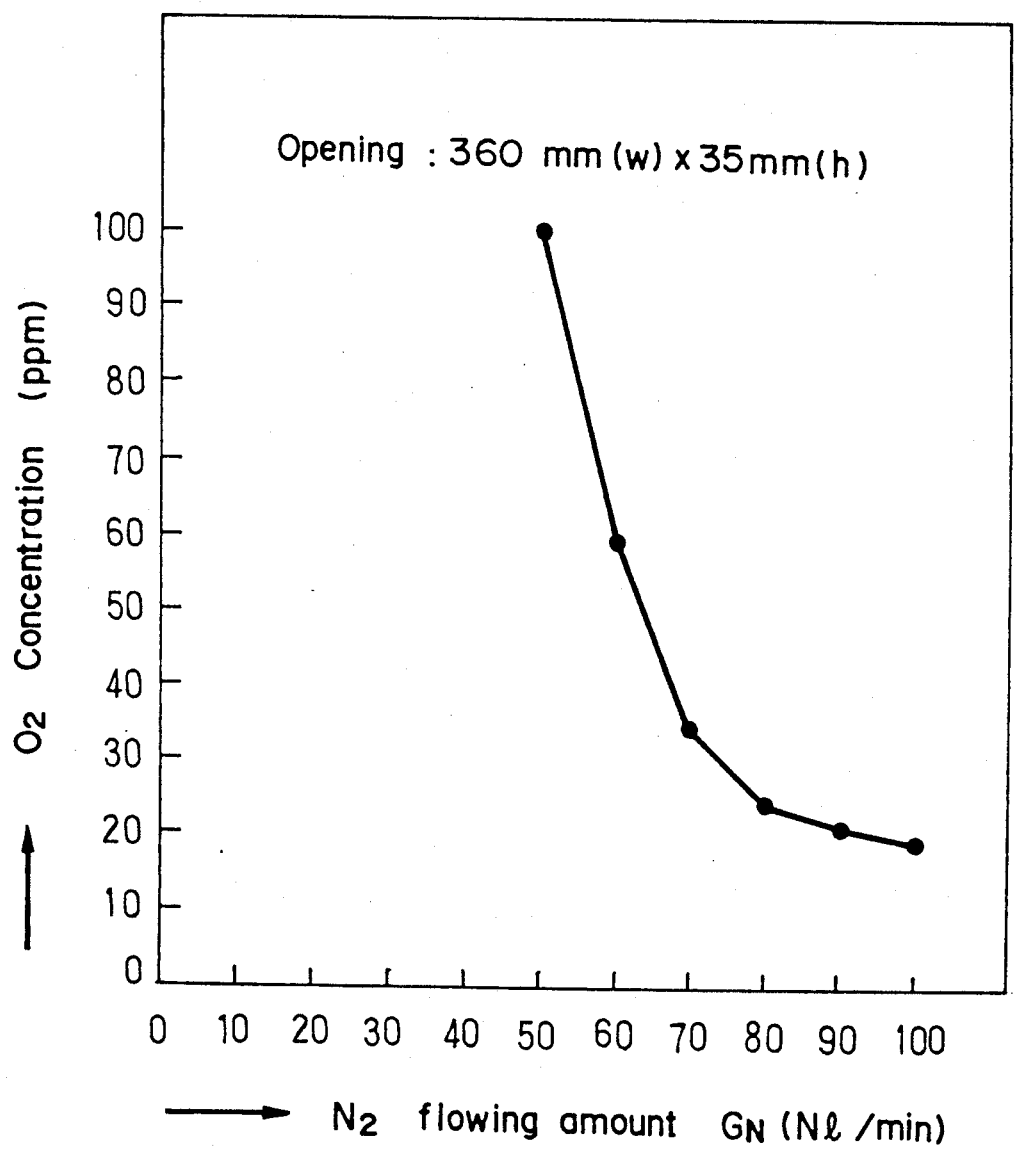

FIG_5(a)
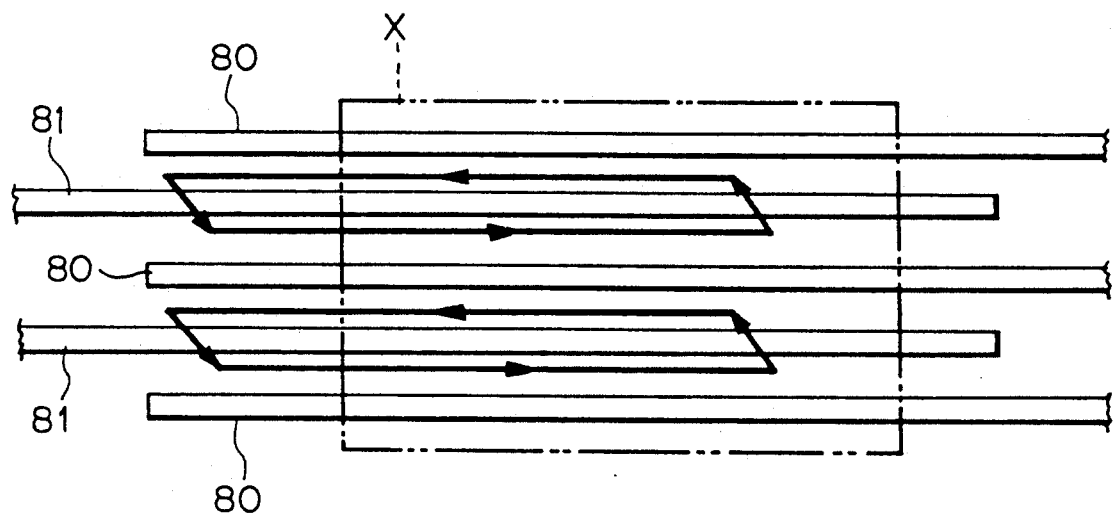
FIG_5(b)
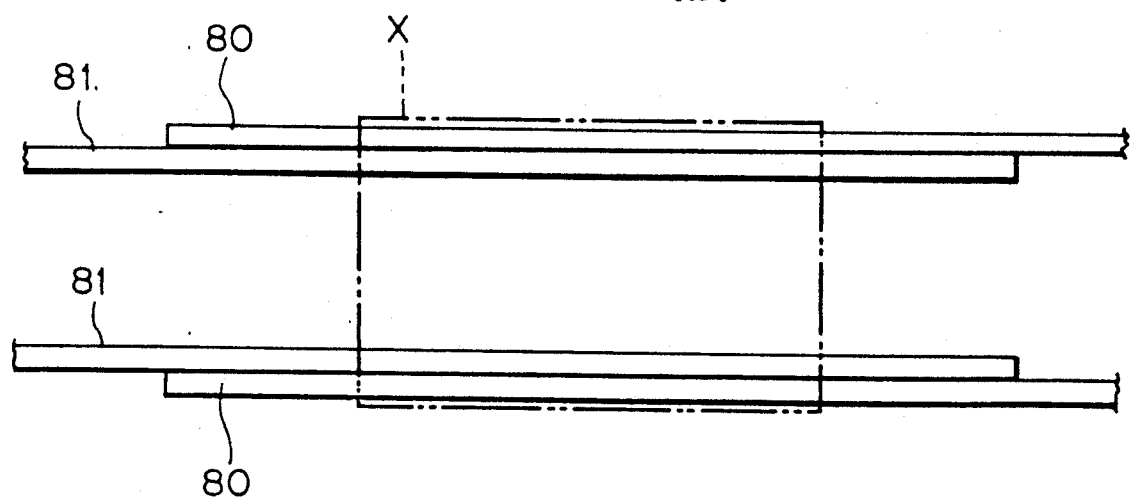

FURNACE OF DECREASING OXYGEN CONCENTRATION TO ULTRA LOW AMOUNT

FIELD OF THE INVENTION

This invention relates to a furnace where an atmosphere therein is controlled to decrease an oxygen concentration to an ultra low amount.

BACKGROUND OF THE INVENTION

There have been developed furnaces as a reflow furnace, a firing furnace and a drying furnace, which isolate invasion of an external atmosphere and perfectly control the atmosphere in the furnace so as to prevent influences by oxidation under operations therein.

In view of conventional furances that, although a good deal of atmospheric gas is supplied, the oxygen concentration is still high (if $N_2$ gas is supplied into the furnace at the flowing amount of 300 to 500 Nl/min, the oxygen concentration could not be lowered to 500 ppm; herein Nl: the amount at 0° C. and 1 atmospheric pressure under standards conditions), the inventors proposed a method and a furnace structure where the oxygen concentration could be considerably decreased with a less amount of using an atmospheric gas.

A proposed technological content is that the atmosphere is controlled and the internal pressure therein is made high for checking invasion of the atmosphere, but since the isolation is still insufficient therewith, a complete isolation is made between the zones and between the inside and the outside of the furnace, and only when a work to be treated passes, the isolation is temporarily broken, thereby to check the atmospheric invasion nearly zero, and by sending the work intermittently, any undesirable influence is not given to the isolation.

As a result, the oxygen concentration could be lowered to an extent which has been unexpected in the prior art. (In the example, when $N_2$ gas was supplied into the furnace at the flowing rate of 80 Nl/min, the oxygen concentration of 15 ppm could be realized.)

A reflow furnace is used to solder to mount parts (mainly LSI) together on a surface of a printed wiring plate. In a case of applying the above stated furnace structure to the reflow furnace, when performing the reflowings on both upper and under surfaces of the plates in response to mounting the parts on the both surfaces, which has recently often carried out, intermittently sending device for practising the reflow has following conditions. Since both surfaces of the work must be exposed to the atmosphere within the furnace, the intermittently sending device must have contacting areas as small as possible at the upper and under surfaces.

In the above mentioned structure, a walking beam system has now been employed as the intemittently sending device. The walking beam is, as shown in FIG. 5(a), composed of stationary beams 80 laid in parallel and movable beams 81 which moves in rectangle. A work X is moved on the movable beams 81 while the beams 81 rise and move horizontally, and on the other hand, while the beams 81 go down and return, the work X is positioned on the stationary beams. Thus, the intermittent sending is carried out on the work X. The lower part of the work X contacts either of the stationary beams 81 or the movable beams during operation, the contacting parts of the work X are not exposed to the atmosphere in the furnace at which unsatisfied parts would occur.

For lessening such disadvantages as possible, it may be considered that two stationary beams 80 are, as shown in FIG. 5(b), positioned in parallel according to the width of the work X, and the work X is supported on the beams 80 at the both sides of the under surface, and movable beams 81 are positioned adjacent to the stationary beams 80, so that the under surface of the work X widely contacts the atmosphere in the furnace.

However, if the work X is a base plate to be mounted thereon with tips of IC, LSI etc, it is difficult to keep excess parts in the work X by the amounts pf the contacting widths of the beams, since the width of the work X is small, and the tips are mounted in a full width of the work X.

The above mentioned is a big problem to not only the reflow furnace but also other atmospheric furnaces when the structures thereof are provided such that the both sides of the work contact the atmosphere therein for heightening reaction efficiency between the work and the atmosphere.

SUMMARY OF THE INVENTION

The present invention has been realized in view of these problems, and is to provide a structure of the atmospheric furnace which enables to treat the both sides of the work through reviewing the structures of conventional furnaces.

For accomplishing this object, a furnace of decreasing oxygen concentration to ultra low amount is basically characterized by providing a furnace body divided into a plurality of zones, a device for supplying a non-oxidizing or a reducing atmospheric gas into each of the zones so as to increase the internal pressure, shutter devices provided at least at an inlet and an outlet of the furnace body for checking the flowing atmosphere, transferring devices installed at the inside of the furnace, at the interior and at the outside thereof respectively, and a control device for opening the shutter device before the work in a transferring direction, wherein the trasferring device installed within the furnace supports the work at its both sides of the under surface and continuously send it while the upper surface of the work is exposed to the atmosphere in the furnace.

In order to transfer the work while its upper and under sides are exposed to the atmosphere, such a structrue is desirable which carries the work by supporting it at least at its both sides of the under face so that the work is exposed to the atmosphere over almost all of the under face. As the desirable transferring device, there are devices which use belt conveyors or chain conveyors positioned in parallel with a space almost corresponding to the width of the work. But those are models of continuous sending, and if those models are installed consecutively inside and outside of the furnace, it is difficult to interrupt the atmosphere by means of the shutter device. Thus, in the present invention, independent transferring devices are provided at least at the inlet, the interior and the outlet of the furnace, respectively, thereby to perfectly avoid the invasion of the external air into the furnace.

Some of the atmospheric furnaces are composed by providing in series of the preheating—heating zones and the cooling zone, and in these furnaces it is better to check as possible the flowing of the atmosphere per each of the zones. The shutter devices are positioned therein not only at the inset and the outlet of the furnace but at one or a plurality of parts between the zones within the furance, so that the atmosphere does not flow between the zones. In order that the transferring device within the furnace does not hinder the shutter device, the transferring devices must be independent back and forth of the shutter device.

Further, if the transferring speed increases at the inlet and the outlet than at the interior of the furnce, it is sufficient to shorten the opening time of the shutter device at the inlet and the outlet with the control device so as to check the introduction of the air into the furnace. The transferring speed within the furnace is normally slow for providing reactions between the work and the atmosphere therein, and in such a case the above mentioned adjustment of the transferring speed is very useful.

BRIEF DESCRIPTION OF THE DRAWINGS

FIG. 1 is a view showing an embodiment of treating the both surfaces of a work in a reflow furnace having a structure of the invention;

FIG. 2 is a perspective view showing a structure of a chain convayor serving as a transferring device in the present embodiment;

FIGS. 3(a)(b) show transferrings of the work X, and shutter devices under operation by a control circuit in accordance with the former;

FIG. 4 is a graph showing a relation between $N_2$ gas flowing amount and $O_2$ concentration in a main heating zone within a reflow furnace; and FIGS. 5(a)(b) show operations of a transferring device which has been proposed by the present assignees.

DETAILED DESCRIPTION OF THE INVENTION

FIG. 1 shows the outlined view of the reflow furnace having a structure according to the invention. An instant furnace is composed of preheating zones 1a.1b, a main heating zone 2 and a cooling zone 3. Devices for performing heat treatments in these zones are convective for reflowing on the both surfaces of the work X.

The heating zones 1a,1b,2 are provided with panel shaped far infrared radiation ceramic heaters at the upper parts therein, and fin shaped heaters encircling around tubes at the lower parts therein, and the atmospheres are heated and made convection flowings, so that the work sent in the zones is indirectly heated. The cooling zone is provided with a fan for circulating the atmosphere to cool the work.

The pre-heating zone 1a is formed with gas jetting holes 4 at two positions of an upper part and a lower part, the other pre-heating zone 1b is formed with a gas jetting hole 4 at one position of a lower part, the main heating zone 2 is formed therewith at two positions of an upper part and a lower part, and the cooling zone 3 formed therewith at two positions of an upper part and a lower part. These have jetting holes are connected to an $N_2$ gas bomb (show shown) for supplying $N_2$ gas into each of the zones (if the gas is supplied more than a determined amount, it is possible to easily maintain an internal pressure under a positive pressure).

Shutter 5a to 5c are provided between the inlet and outlet and between the main heating zone 2 and the cooling zone 3, and gates 50 of the shutters are elevated by a cylinder (not shown) for air-sealing and releasing thereabout. In the present embodiment, partitions 10 are installed between the pre-heating zones 1a.1b and between the pre-heating zone 1b and the main heating zone 2 for lessening the flowing of the atmosphere. The partition 10 has a frontage enough to pass the work X.

Further, in this embodiment, independent transferring devices 6a to 6f are disposed in series at the inlet of the furnace, within the zones 1a.1b. and at the outlet thereof.

The transferring devices 6a to 6f will be referred to. As shown in FIG. 2, the device is composed of two chain conveyors 60,61, the distance between the two almost corresponding to the width of the work X. Each of cells of the conveyors 60,61 is attached with projections 63 on which the work is supported by contacting at the both sides of the underface. Accordingly, in each of the zones 1a,1b,2,3 almost allover underface of the work may be also exposed to the atmosphere. Thus, the both sides reflowing is possible. Since the transferring devices are independent at the inlet, outlet and between the zones, the flowing of the atmosphere can be interrupted securely by the shutters 5a to 5c. and by the frontages of the partitions 10, and the heating efficiency at each of the zones is more heightened, and the air is prevented from going into the heating zone 2.

There is installed a control device 7 outside of the furnace for opening and closing the shutters 5a to 5c. The control device opens only the shutters at the inlet and the outlet when the work X goes into the furnace (preheating zone 1a), when it goes from the heating zone 2 to the cooling zone 3 and when it goes outside of the furnace. For example, when the work X is sent to the pre-heating zone 1a, only the shutter 5a is opened and closed after 1 second (the other shutters are kept closed) as shown in FIG. 3(a). The work X passes on the transferring devices 6b to 6d through the preheating zones 1a,1b and the heating zone 2, and is given a desired heating treatment there. Also when the work X is sent to the subsequent cooling zone 3, the control device 7 opens the shutter 5b only as shown in FIG. 3(b) and closes it after 1 second. The sending of the work X and the opening-closing operation of the shutter are repeated, and the work X is sent outside of the furnace after the determined heating treatment. The opening timing of the shutters by the control device 7 may depend upon sensing of sensors provided just before the shutters, which sense the coming work X, or opening of the shutter for predetermined time intervals by previously inputting the transferring distance and speed of the transferring devices 6b,6c,6d,6e.

The transferring speed within the furnace is set to be slow for exactly imparting the heat treating effect, and that outside of the furnace is set to be considerably slow in comparison with the former. This is because to check the introduction of the air by shortening the opening time of the shutters 5a to 5c when the work is sent into the furnace and outside of the furnace. The transferring speed may be adjusted between the heating zone 2 and the cooling zone 3. When the work X on the device 6d comes just before the shutter 5b through the heating zone 2, the speed of the device 6e is heightened at the cooling zone 3. When the shutter 5b is opened and the work X is sent to the cooling zone 3 the work X may be rapidly moved since the transferring speed is high, and as a result, the atmosphere may controlled to be slow between the heating zone 2 and the cooling zone 3 by shortening the opening time of the shutter 5b, thereby enabling to further heighten the heat treating efficiency in the both zones.

The inventores used the reflow furnace of the above mentioned structure and practised the reflowing of the both sides and obtained products mounted with tips of LSI, IC, etc. on the both sides. The yield of products at that time was about 500 to 1000 ppm preferably in comparison with that of 2000 ppm when practising in the atmosphere, from which it has been cleared that the reflowing on the both sides is possible in an actual line.

FIG. 4 is a graph showing the relation between the amount of $N_2$ (purity: 99.999%) supplying into the entire zones 1,1b,2,3 and the oxygen concentration measured in the main heating zone 2. Conditions of the furnace are as follows.

| | |
|---|---|
| Total capacity of the zones 1, 1b, 2, 3 | 0.32 m³ |
| Size of the opening between the inlet - outlet - the main heating zone 2 and the cooling zone 3 | 360 mm(w) · 35mm(h) |
| Sizes of the opening between the pre-heating zones 1a and 1b, and between the pre-heating zone 1b and the main heating zone 2 | 330 mm(w) · 35 mm(h) |
| Opening time of the shutters | 1 second |
| The sending time of the work at the transferring devices (in the furnace) | 180 seconds |

Also in this embodiment, as in the furnace proposed by the assignees, when $N_2$ gas flowing amount was 100 Nl/min, the oxygen concentration in the heating zone 2 was at most 20 ppm, and thus it is seen from the same that remarkable effects are brought about to decreasing of the oxygen concentration and the gas supplying amount in comparison with the conventional reflow furnace that when $N_2$ gas was supplied much as 300 to 500 Nl/min, the oxygen concentration was at most about 500 ppm.

A drive circuit of the cooling zone 3 and the transferring devices 6e and 6f at the outlet side may be one, and when the work X is at the cooling zone 3, the speed of the device 6e is set to be low, and when the work is conveyed outside of the furnace, the speed of the device 6f may be set to be high.

What is claimed is:

1. A furnace with an ultra low amount of oxygen concentration, comprising an inlet; an outlet; a plurality of zones between said inlet and said outlet; means for supplying a non-oxidizing gas into each of said plurality of zones to increase an internal pressure therein; shutter means at least at an inlet and an outlet of said furance for checking flow of air into said furnace; control means for controlling operation of said shutter means; means for transferring a workpiece through said furnace and including a transferring arrangement for transferring the workpiece between said plurality of zones, said transferring arrangement having a speed which is lower than speeds of workpiece transferring elements located at said inlet and said outlet whereby opening time of said shutter means is reduced; and a plurality of partitions for separating said plurality of zones, each of said plurality of partitions having opening means having a predetermined size corresponding to the size of the workpiece for passing the workpiece through said partitions, said transferring arrangement comprising a plurality of independently operating endless conveyors corresponding in number to a number of zones in said plurality of zones, each of said plurality of endless conveyors having means projecting transverse to a path of movement of the workpiece for supporting the workpiece at both sides of the workpiece during transfer of the workpiece through said plurality of zones with the upper surface of the workpiece being exposed to an atmosphere in said plurality of zones.

* * * * *

UNITED STATES PATENT AND TRADEMARK OFFICE
CERTIFICATE OF CORRECTION

PATENT NO. : 5 044 944

DATED : September 3, 1991

INVENTOR(S) : Toshio Furuya, et al.

It is certified that error appears in the above-identified patent and that said Letters Patent is hereby corrected as shown below:

On the title page

[30] the foreign application priority data should read

-- Oct.12,1989 [JP] Japan  1-265688 --

Signed and Sealed this

Twelfth Day of January, 1993

Attest:

DOUGLAS B. COMER

*Attesting Officer*  *Acting Commissioner of Patents and Trademarks*